March 8, 1932.    F. RÜSBERG ET AL    1,849,043
PRODUCTION OF SOLID AMMONIUM CARBONATE
Filed Nov. 6, 1926
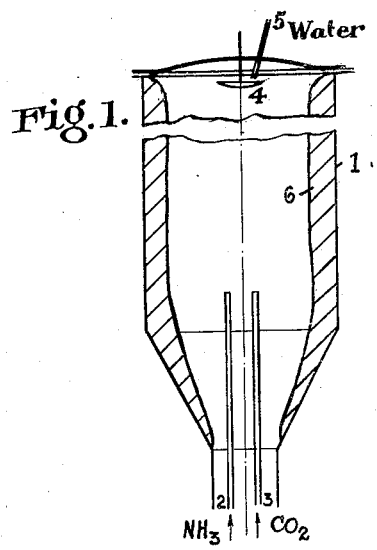
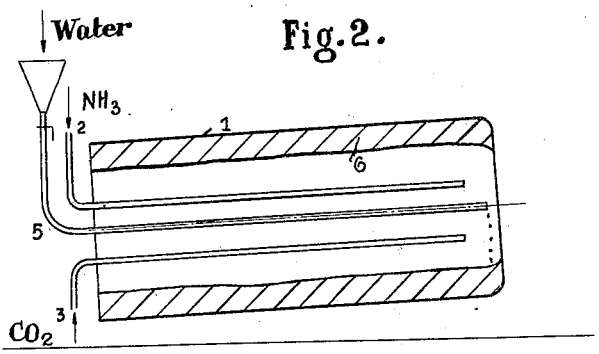
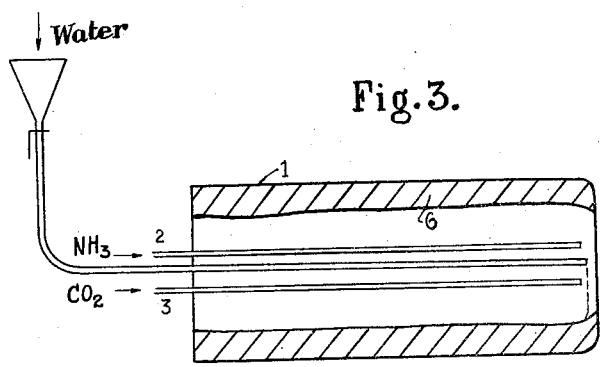
Inventors:
Friedrich Rüsberg
Gustav Clauss
by Paul ...
Attorney Patented Mar. 8, 1932

1,849,043

UNITED STATES PATENT OFFICE

FRIEDRICH RÜSBERG, OF MANNHEIM, AND GUSTAV CLAUSS, OF MANNHEIM-WOHLGELEGEN, GERMANY, ASSIGNORS TO THE FIRM RHENANIA-KUNHEIM VEREIN CHEMISCHER FABRIKEN A.-G., OF BERLIN, GERMANY

PRODUCTION OF SOLID AMMONIUM CARBONATE

Application filed November 6, 1926, Serial No. 146,846, and in Germany December 7, 1925.

This invention relates to the production of solid crusts of ammonium carbonate directly from its components. In the known processes of this kind ammonia and carbon dioxide are heated together with steam to a temperature above the decomposition point of ammonium carbonate, and then the vapors obtained are cooled down in sublimation chambers.

Now we have found that solid crusts of uniform composition can be immediately obtained by employing only two of the components, viz. ammonia and carbon dioxide, in the gaseous, but the water in the liquid state. By employing the water in the form of a liquid one is able to proportion its quantity in a convenient and reliable manner. Furthermore we have found that when employing water in its liquid form we are obliged to make the reaction take place on the surface of the walls of the reaction vessel. For this purpose the walls of the reaction vessel may be continuously or intermittently coated, by suitable means, with a thin layer of liquid, while simultaneously gaseous ammonia and carbon dioxide are introduced by separate or common pipes. The production of ammonium carbonate takes place almost exclusively upon the walls of the reaction vessel, and the ammonium carbonate is obtained in the form of crusts gradually growing thicker and thicker. Instead of water, solutions of ammonium carbonate or ammonia water may also be used for sprinkling the walls. Of course, in the latter case the amount of ammonia introduced with the ammonia water must be taken into consideration in proportionating the amount of ammonia to be introduced in the form of gas.

The liquid layer on the walls of the reaction vessel may be produced in various ways. For instance a cylindrical vessel arranged in a slightly inclined, almost horizontal position may be made to rotate and water in calculated amounts is trickled in droplets upon one side of the said cylinder. The water runs gradually to the lower part of the vessel coating its walls with a thin film of liquid. On the other hand, the cylindrical vessel may also be made to rotate without however being inclined at all and may from the beginning be filled with a determined quantity of water or ammonium carbonate solution. Finally, the liquid may be projected, by means of a suitable device, for instance, a turbo-sprayer or a rotating disc, against the inner walls of an upright reaction vessel of any suitable form, whereby the said walls will also be coated with a thin and uniform layer of liquid. Should a part of the solution flow back, it may be used for further sprinkling the walls.

We have further found that the quality of the crusts, especially as to their hardness, may be considerably increased by regulating the temperature in the reaction zone within certain limits, either by cooling or, if required, by exterior heating. Preferably a temperature of about 60° C. should not be surpassed, as at higher temperatures the ammonium carbonate formed is already redecomposed.

The best results have been obtained with temperatures between 35 and 45° C. Should this temperature be surpassed owing to the heat produced by the reaction, the desired temperature may be adjusted by artificial cooling means, for instance by sprinkling the outer surface of the reaction vessel with cold water. On the other hand, the temperature may be increased by exterior heating. However, the starting materials may also be proportioned in such a manner that the reaction heat suffices to maintain the temperature of the reaction zone at the desired level.

Finally, we have found that the process can be carried out at temperatures exceeding 60° C., provided that the reacting components are introduced under elevated pressure.

Examples

1. From the top of an upright cylindrical apparatus made of lead or aluminum a rotating disc is suspended for spraying water on the inner walls of the vessel. Ammonia, carbon dioxide and liquid water are introduced in such proportions that about 350 to 450 grams of ammonium carbonate are formed per hour and square meter of the reaction surface. The temperature of the reaction zone is, due to the reaction heat, kept continuously at a value of about 40° C.

2. Gaseous ammonia and carbon dioxide are forced into an autoclave whilst simultaneously the equivalent quantity of water is pressed into the autoclave and distributed by means of a sprayer on the inner walls of the vessel. The quantity and the proportions of the components are calculated so as to produce 2.5 to 3 kilograms of ammonium carbonate per hour and square meter of the reaction surface. The temperature is considerably increased. Care is taken by cooling that a temperature of from 70 to 80° C. is not considerably exceeded. Thereupon the temperature is decreased to room temperature, whereby the pressure which during the reaction had risen to 40-50 atm. is considerably reduced. Solid crusts of ammonium carbonate containing 22-24 p. ct. of $NH_3$ are obtained at the walls of the autoclave.

The manner in which the invention is carried out may be illustrated by the annexed drawings in which Fig. 1 shows an apparatus in which a stationary vertical cylinder forms the reaction chamber. Figs. 2 and 3 show rotary cylinders in an inclined or horizontal position respectively. The same reference numerals are used for corresponding parts in all figures.

In Fig. 1, 1 is a stationary cylinder into which the gases $NH_3$ and $CO_2$ are introduced from the bottom through pipes 2 and 3. At the top of this cylinder a regulable rotary disk 4 is provided onto which the water required for forming the solid ammonium carbonate is fed through pipe 5. By this rotary disk the water is projected in a uniform manner against the walls (not into the hollow space) of the vessel, forming there a coherent thin film of liquid which slowly flows downwards and on its way is practically completely consumed to form ammonium carbonate of uniform composition. Thereby coherent crusts 6 of ammonium carbonate are formed as shown in the drawings.

In the apparatus illustrated in Fig. 2 the water introduced through pipe 5 forms a thin film progressing on the walls of the vessel to its lowest part. In this way the water is completely consumed, forming the crusts 6 which gradually increase in thickness.

Fig. 3 in which the cylinder 1 is slowly rotated about a horizontal axis needs no further explanation.

We claim:

Process of directly producing solid cohering crusts of ammonium carbonate from its components, which comprises introducing ammonia and carbon dioxide gases into a vessel, sprinkling surfaces in contact with the said gases in the said vessel with water containing ammonia and carbon dioxide, and again sprinkling the said surfaces with the liquid flowing off from these surfaces.

In testimony whereof we affix our signatures.

FRIEDRICH RÜSBERG.
GUSTAV CLAUSS.